June 24, 1947.  D. F. ALEXANDER  2,422,766
PEAK TRANSIENT METER
Filed Nov. 30, 1942  2 Sheets-Sheet 1

Donald F. Alexander, INVENTOR.
BY Spencer, Hardman & Fehr,
His Attorneys.

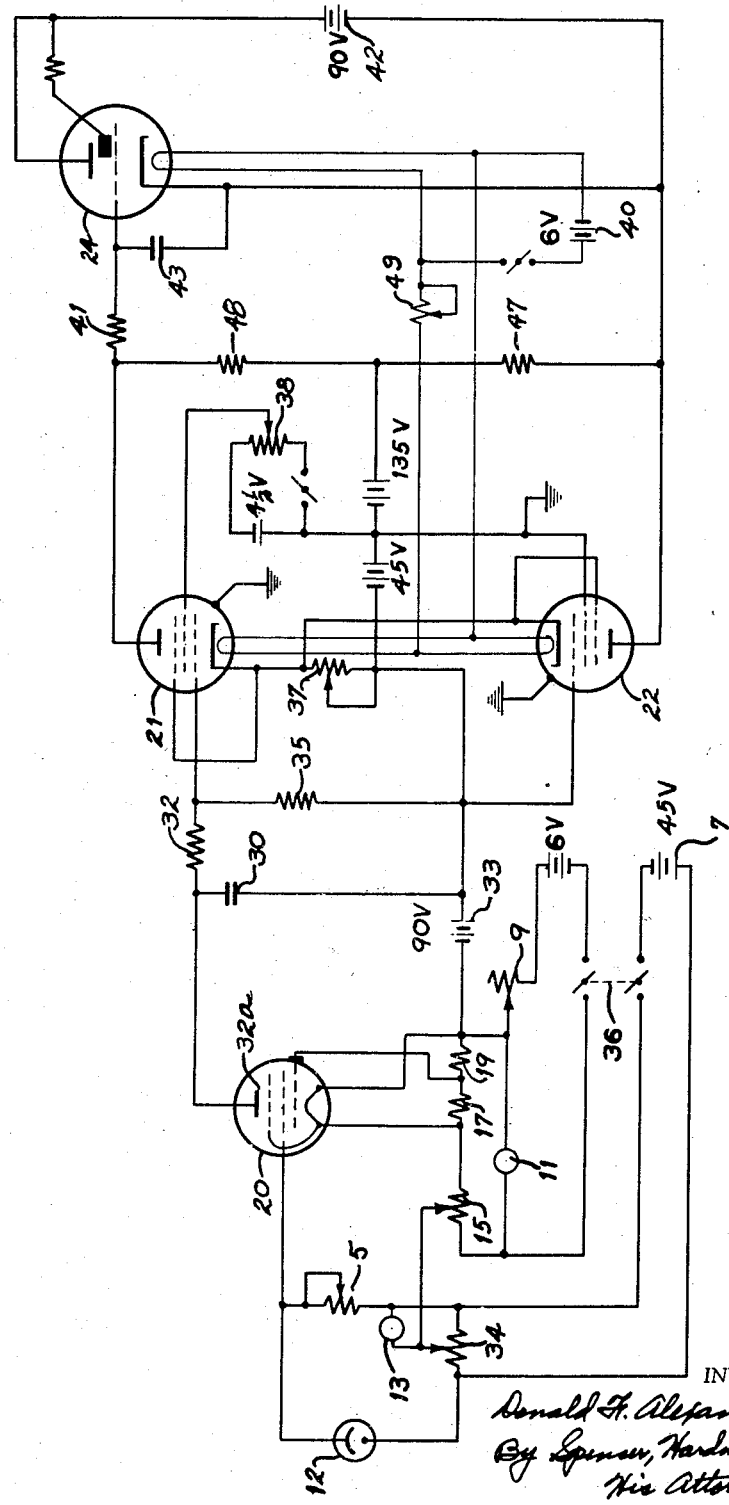

Patented June 24, 1947

2,422,766

UNITED STATES PATENT OFFICE 2,422,766

PEAK TRANSIENT METER

Donald F. Alexander, Oakwood, Ohio, assignor to General Motors Corporation, Dayton, Ohio, a corporation of Delaware Application November 30, 1942, Serial No. 467,422

5 Claims. (Cl. 171—95)

This invention relates to an electrical appliance and more particularly to a peak transient light meter.

One object of this invention is to provide an instrument capable of checking the intensity of light flashes of short duration.

Another object of this invention is to provide a portable low cost instrument for measuring and indicating the peak light values of an intermittent light source.

Still another object of this invention is to provide a portable, compact, light weight, completely battery operated, light meter.

A further object of this invention is to provide an indicator which does not require the use of delicate and expensive indicating elements.

A further object of this invention is to provide a peak transient light meter in which the readings are independent of battery and tube changes during use.

Further objects and advantages of the present invention will be apparent from the following description, reference being had to the accompanying drawings, wherein a preferred form of the present invention is clearly shown.

In the drawings:

Fig. 3 is a detailed circuit diagram of a light meter constructed in accordance with my invention.

The light meter described herein is primarily intended to measure the intensity of a light signal emitted by a flasher type of signalling apparatus. More particularly it is intended for use in a flasher type of signalling system wherein the flashes consist of intensive flashes of extremely short duration which may last less than 25 micro-seconds. The flashes emanate from the source 10 and may for example occur at a rate of about ten per second and may be either visible or invisible light rays. Because of the small amount of energy in each peak, ordinary light measuring means would not give a proper measurement of the signal. Since the flashes emanating from an ordinary flasher will vary some in intensity, the light meter is designed to average a succession of these peak values. Thus the light meter is intended to translate the light in each peak into a voltage impulse which is proportional to the height of the peak and the intensity of the light. Due to the shortness of the duration of each flash and due to the small amount of energy available for measurement it is desirable to so construct and operate the apparatus as to embrace in the measurement a series of light peaks. This way, one in effect measures the average peak value of the flashes and thus obtains a more correct evaluation than would be given by a single peak. As shown diagrammatically in Fig. 2 the peaks of the flashes vary some in height and the energy of that portion of each peak which projects above the upper horizontal line is very small.

Figure 1:
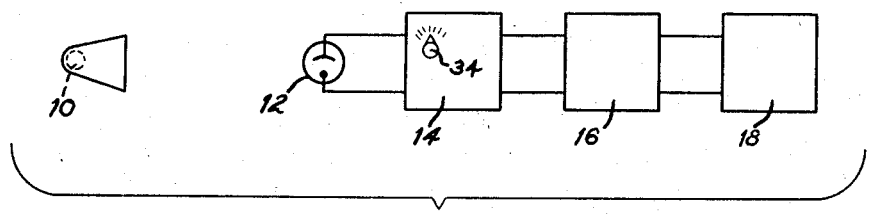
Fig. 1 is a diagrammatic view showing a light source and the main elements of a peak transient light meter constructed in accordance with my invention.

I have found that these peak light values may be averaged by means of a light meter which comprises a photocell 12, an integrator generally designated by the reference numeral 14, an amplifier 16 and an indicator element 18 arranged as diagrammatically shown in Fig. 1. The electric circuits are shown in detail in Fig. 3. The circuit arrangement may be used for measuring either visible or invisible radiations by selecting the proper photocell. The type of photocell used will of course depend upon the nature of the radiations to be measured and the sensitivity required.

A calibrated threshold sensitive adjustment 34 is provided in circuit with the photocell 12 as shown in the diagram. This permits determination of the signal strength by suitable calibration of the adjustment positions. If desired, a voltmeter 13 may be connected as shown in which case it is not necessary to make changes in the calibration of the instrument to compensate for changes in the voltage of battery 7, since adjustments may be made so as to maintain the voltage reading constant. When measuring invisible radiations, a light filter, such as a Ratten No. 87 filter (not shown) may be used.

Figure 2:
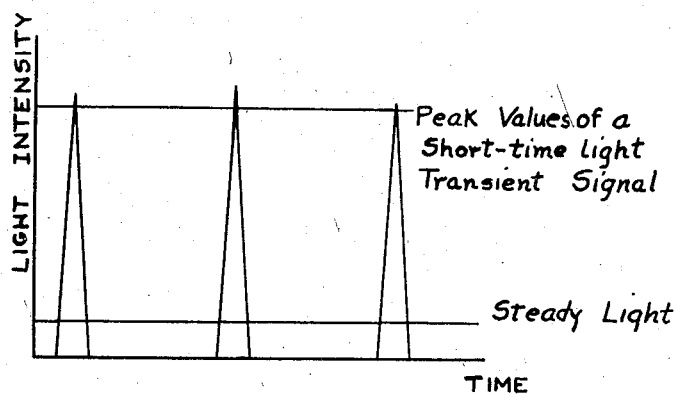
Fig. 2 represents a graph showing light values as ordinates and time as abscissa.

Inasmuch as there will be interfering light sources from time to time, provision has been made for eliminating the effect of these interfering light sources as explained hereinafter. However, these interfering light sources do not materially affect the operation of the light meter under normal conditions, since the interfering light sources normally encountered, have a steady value which is relatively insignificant to the value of the light peaks to be measured. As shown in Fig. 2 the interfering light may be represented by a substantially horizontal straight line, whereas the light flashes to be measured are represented by a series of high peaks.

The integrator 14 comprises a pentode tube 20 having a filamentary cathode and may, for example, be a tube of the type commonly known as 1E5GP. The rather unusual "space-charge" tetrode connection is used wherein the first or signal grid is fixed at average filament potential by means of the resistors 17 and 19, and the second or screened-grid is used as the actual signal grid. A zero plate-current setting has been provided for the tube 20 which comprises a potentiometer 15 arranged in circuit, as shown. By virtue of this arrangement the potentiometer 15 may be adjusted so that no plate-current can flow through tube 20 until a signal is received from the photocell circuit.

Voltmeter 11 in conjunction with the adjustable rheostat 9 avoids the necessity of changing the potentiometer 15 with changes in filament-battery voltage.

The amplifier indicator stage as shown on the diagram includes two pentode tubes 21 and 22 which may, for example be type 6SJ7 and an electron-ray indicating tube 24 which may be type 6E5. The two pentode tubes 21 and 22 are connected in circuit in such a manner that a single battery may be used to supply both of the anodes. The amplifier arrangement makes it possible to amplify a varying signal of unidirectional polarity and is equivalent to a single stage amplifier without any degeneration of the signal, due to the presence of the usual cathode-bias resistor 37 thereby making a single stage requiring only the one anode battery to perform the functions of two or more stages.

For best operation, I have found it desirable to connect the output capacitor 30 between the anode battery 33 and the anode 32A of the integrator tube 20 and to place a high impedance 32 in the line leading from the integrator tube 20 to the amplifier circuit. Resistor 32 must be selected of such a value that in conjunction with grid resistor 35, the capacitor 30 will remain charged to a voltage proportional to the average peak value of the signals being received. Grid resistor 35 may, for example, have a resistance value of 2 million ohms and resistor 32 may have a resistance of 8 million ohms to maintain suitably the charge on capacitor 30 which may be a .037 microfarad condenser. Since an appreciable change in grid-bias voltage will result from the flow of an unwanted grid-current as small as one micro-ampere through the grid resistor 35 it is important to use a cathode-resistor bias rather than a fixed battery-bias. With such an arrangement large increases in plate-currents due to the unwanted grid currents are self-compensating in a degree, through the increase in negative grid-bias due to increased plate-currents flowing through the cathode resistor. In an ordinary amplifier circuit the use of a cathode-bias resistor common to the input and the output circuit of an amplifier produces an unwanted negative feedback effect. In A. C. amplifiers this is avoided by suitably shunting the resistor with a capacitor which by-passes the signal currents without disturbing the direct current bias. In direct current amplifiers this cannot be done.

As shown in Fig. 3 applicant's circuit includes two duplicate tubes opposed to each other in a push-pull circuit, but having a common cathode-resistor 37, and the polarity is such that decreased bias-drop due to receipt of a negative direct current signal on the grid of the first tube increases the plate-current of the second tube. The amount of this increase is exactly equal to the amount of decrease in the plate-current in the first tube due to the decreased bias-drop. Since the two plate-currents are additive through the cathode-resistor, the effect of using the second tube is to minimize changes in bias-drop, that is, to reduce the feedback to zero. This arrangement gives maximum amplification. By virtue of this arrangement the voltage gain is the same as that for a tube with a fixed battery-bias, that is, there is no negative feedback despite the use of a cathode-resistor type of bias. A further advantage in using the above circuit is that the voltage output is zero when the signal is zero, or can be made of small value and of a polarity to suit the no-signal setting of the visible target of tube 24 by adjustment of the first tube screen voltage by adjusting the potentiometer 38 as shown. The above arrangement obviates the requirement for a separate bias battery for tube 24.

The indicator portion of the circuit makes use of a conventional cathode-ray tube 24 such as the 6E5 tube in which the filament is energized from the same battery 40 which energizes the filaments of the amplifier tubes 21 and 22. A 90 volt plate battery 42 is used with tube 24 as shown.

The 6E5 indicator stage was designed to avoid the use of an oscilloscope or a sensitive microammeter for such indication. To obtain maximum sensitivity, a low plate voltage supply (90 volts) was used consistent with obtaining a clear image. A small amount of A. C. inductive image flutter was avoided by the addition of an input filter compressing a 1 megohm resistor 41 in series with the grid, and 0.1 mfd. capacitor 43 connected from grid to cathode as shown.

The resistors 47 and 48 are the usual plate loading resistors. This arrangement permits the use of a common plate battery for the tubes 21 and 22.

The values of the resistances, capacitor, etc., are given for purposes of illustration only as it is obvious that other values may be used without departing from the spirit of my invention.

By virtue of the above described arrangement the instrument is capable of averaging a succession of peak light values rather than measuring a single peak value. Furthermore the readings are independent of battery and tube changes during use.

While the form of embodiment of the invention as herein disclosed, constitutes a preferred form, it is to be understood that other forms might be adopted, all coming within the scope of the claims which follow.

What is claimed is as follows:

1. Means for receiving a plurality of unidirectional pulses of variable amplitude, means for rendering only the peaks of said pulses effective, a storage condenser, means for applying said peaks to said storage condenser, a timing circuit associated with said condenser for discharging said condenser at a given rate whereby the charge present on said condenser is indicative of the average peak values of said pulses, and means for indicating said average peak values.

2. Means for receiving a plurality of unidirectional irregular pulses of variable amplitude, means for rendering ineffective that portion of said pulses below a given value, a storage condenser, means for applying the remaining peaks of said pulses to said storage condenser, a discharge circuit associated with said condenser for discharging said condenser at a given rate whereby the charge present on said condenser is indicative of the average value of said pulses above said given value, and means for indicating said average pulse values.

3. Means for receiving a plurality of unidirectional pulses of variable amplitude, means for rendering only the peaks of said pulses effective, a storage condenser, means for applying said peaks to said storage condenser, a timing circuit associated with said condenser for discharging said condenser at a given rate whereby the charge present on said condenser is indicative of the average peak values of said pulses, and means for indicating said average peak values, the values of said storage condenser and said timing circuit being so proportioned that said condenser remains at least partially charged between successive pulses.

4. Means for receiving a plurality of unidirectional pulses of variable amplitude, means for rendering only the peaks of said pulses effective, a storage condenser, means for applying said peaks to said storage condenser, a timing circuit associated with said condenser for discharging said condenser at a given rate whereby the charge present on said condenser is indicative of the average peak values of said pulses, and means for giving an indication of the presence of a voltage charge on said storage condenser.

5. Means for receiving a plurality of unidirectional pulses of variable amplitude, means for rendering only the peaks of said pulses effective, a storage condenser, means for applying said peaks to said storage condenser, a timing circuit associated with said condenser for discharging said condenser at a given rate whereby the charge present on said condenser is indicative of the average peak values of said pulses, and means for indicating the accumulation of a charge on said condenser due to said pulses, the values of said storage condenser and said timing circuit being so proportioned that said condenser remains at least partially charged between successive pulses.

DONALD F. ALEXANDER.

REFERENCES CITED

The following references are of record in the file of this patent:

UNITED STATES PATENTS

| Number | Name | Date |
|---|---|---|
| 2,239,363 | Gilbert | Apr. 22, 1941 |
| 2,092,874 | Burnside | Sept. 14, 1937 |
| 1,949,564 | Dunn | Mar. 6, 1934 |
| 1,561,837 | Dowling | Nov. 17, 1925 |
| 2,284,289 | Lindsay | May 26, 1942 |
| 1,851,236 | Baseler et al. | Mar. 29, 1932 |
| 1,818,018 | Stocker | Aug. 11, 1931 |
| 2,274,158 | Penther | Feb. 24, 1942 |
| 2,366,320 | Elston | Jan. 2, 1945 |
| 2,269,760 | Eldredge | Jan. 13, 1942 |
| 2,340,714 | Traver | Feb. 1, 1944 |
| 2,300,593 | Perroux | Nov. 3, 1942 |
| 2,176,742 | LaPierre | Oct. 17, 1939 |
| 2,339,198 | Smith | Jan. 11, 1944 |
| 2,272,849 | Perkins | Feb. 10, 1942 |
| 2,372,062 | Dorsman | Mar. 20, 1945 |
| 2,240,635 | Avins | May 6, 1941 |
| 2,153,202 | Nichols | Apr. 4, 1939 |
| 2,222,172 | Dimmick | Nov. 19, 1940 |
| 2,328,056 | Cooley | Aug. 31, 1943 |
| 2,164,939 | Pfister | July 4, 1939 |
| 2,100,755 | Shepard, Jr. | Nov. 30, 1937 |
| 2,225,353 | Scheldorf | Dec. 17, 1940 |
| 2,232,373 | Dorst | Feb. 18, 1941 |
| 2,319,139 | Koch | May 11, 1943 |